United States Patent
Li et al.

(10) Patent No.: US 12,099,482 B2
(45) Date of Patent: Sep. 24, 2024

(54) SYNCHRONIZATION PROCESSING METHOD AND RELATED APPARATUS

(71) Applicant: TENCENT TECHNOLOGY (SHENZHEN) COMPANY LIMITED, Shenzhen (CN)

(72) Inventors: Maocai Li, Shenzhen (CN); Zongyou Wang, Shenzhen (CN); Jinsong Zhang, Shenzhen (CN); Kaiban Zhou, Shenzhen (CN); Yifang Shi, Shenzhen (CN); Huankun Huang, Shenzhen (CN); Qucheng Liu, Shenzhen (CN); Pan Liu, Shenzhen (CN); Hu Lan, Shenzhen (CN); Changqing Yang, Shenzhen (CN); Gengliang Zhu, Shenzhen (CN); Li Kong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 99 days.

(21) Appl. No.: 17/721,231

(22) Filed: Apr. 14, 2022

(65) Prior Publication Data

US 2022/0237153 A1    Jul. 28, 2022

Related U.S. Application Data

(63) Continuation of application No. PCT/CN2021/075370, filed on Feb. 5, 2021.

(30) Foreign Application Priority Data

Mar. 24, 2020  (CN) .......................... 202010212529.5

(51) Int. Cl.
*G06F 16/27* (2019.01)
*G06F 16/21* (2019.01)

(52) U.S. Cl.
CPC ............ *G06F 16/212* (2019.01); *G06F 16/27* (2019.01)

(58) Field of Classification Search
CPC ...................................................... G06F 16/27
See application file for complete search history.

(56) References Cited

U.S. PATENT DOCUMENTS

| 2018/0276668 A1 | 9/2018 | Li |
| 2019/0199515 A1* | 6/2019 | Carver .................. G06Q 20/02 |

(Continued)

FOREIGN PATENT DOCUMENTS

| CN | 100533392 C | 8/2009 |
| CN | 107332876 A | 11/2017 |

(Continued)

OTHER PUBLICATIONS

The State Intellectual Property Office of the People's Republic of China (SIPO) Office Action 1 for for 202010212529.5 Jun. 17, 2020 9 Pages (including translation).

(Continued)

*Primary Examiner* — Grace Park
(74) *Attorney, Agent, or Firm* — ANOVA LAW GROUP, PLLC (57) ABSTRACT

Embodiments of this application provide a synchronization processing method, apparatus, and device, and a medium. The method includes obtaining a skeleton set and a synchronization task set, the skeleton set being used for storing M blocks to be synchronized by the first node device, the skeleton set comprising P skeletons, the synchronization task set comprising P synchronization tasks, the P skeletons being of a one-to-one correspondence to the P synchronization tasks, and M and P both being positive integers; selecting a second node device from the candidate node set, the second node device being a candidate node device in the (Continued)

candidate node set; concurrently transmitting synchronization tasks in the synchronization task set to the second node device, the second node device performing the synchronization tasks and returning the M blocks; and filling the M blocks into the skeletons in the skeleton set.

20 Claims, 7 Drawing Sheets

(56) References Cited

U.S. PATENT DOCUMENTS

| | | | |
|---|---|---|---|
| 2019/0349185 A1 | 11/2019 | Kim et al. | |
| 2020/0389291 A1* | 12/2020 | Xiao | H04L 67/1095 |
| 2021/0184780 A1* | 6/2021 | Yang | H04L 45/54 |
| 2021/0326212 A1* | 10/2021 | Scrivner | G06F 11/1451 |

FOREIGN PATENT DOCUMENTS

| | | | |
|---|---|---|---|
| CN | 109274754 A | 1/2019 | |
| CN | 109522362 A | 3/2019 | |
| CN | 109586934 A | 4/2019 | |
| CN | 110011788 A | 7/2019 | |
| CN | 110430087 A | 11/2019 | |
| CN | 110569305 A | 12/2019 | |
| CN | 110851535 A | 2/2020 | |
| CN | 111444203 A | 7/2020 | |
| WO | WO-2019062182 A1 * | 4/2019 | G06F 16/2358 |

OTHER PUBLICATIONS

The World Intellectual Property Organization (WIPO) International Search Report for PCT/CN2021/075370 Apr. 25, 2021 6 Pages (including translation).

European Patent Office European Search Report for Application No. 21774939.9 Nov. 3, 2022 42 pages.

* cited by examiner

SYNCHRONIZATION PROCESSING METHOD AND RELATED APPARATUS

RELATED APPLICATIONS

This application is a continuation of PCT Application No. PCT/CN2021/075370, filed on Feb. 5, 2021, which in turn claims priority to Chinese Patent Application No. 202010212529.5, entitled "SYNCHRONIZATION PROCESSING METHOD, APPARATUS, DEVICE, AND MEDIUM" and filed with the China National Intellectual Property Administration on Mar. 24, 2020. The two applications are incorporated herein by reference in their entirety.

FIELD OF THE TECHNOLOGY

This application relates to the field of blockchain technologies, and specifically, to blockchain-based synchronization processing.

BACKGROUND OF THE DISCLOSURE

When a node device in a blockchain network performs blockchain synchronization processing, the node device obtains required blocks one by one from other node devices (such as consensus node devices or synchronization node devices) in the blockchain network.

SUMMARY

Embodiments of this application provide a synchronization processing method and a related apparatus, which can effectively improve the synchronization processing efficiency.

One aspect of this application provides a synchronization processing method, performed by a first node device in a blockchain network, the blockchain network including a candidate node set, the candidate node set including a plurality of candidate node devices connected to the first node device. The method includes obtaining a skeleton set and a synchronization task set, the skeleton set being used for storing M blocks to be synchronized by the first node device, the skeleton set comprising P skeletons, the synchronization task set comprising P synchronization tasks, the P skeletons being of a one-to-one correspondence to the P synchronization tasks, and M and P both being positive integers; selecting a second node device from the candidate node set, the second node device being a candidate node device in the candidate node set; concurrently transmitting synchronization tasks in the synchronization task set to the second node device, the second node device performing the synchronization tasks and returning the M blocks; and filling the M blocks into the skeletons in the skeleton set.

Another aspect of this application provides a synchronization processing apparatus, disposed in a first node device in a blockchain network, the blockchain network including a candidate node set, the candidate node set including a plurality of candidate node devices connected to the first node device. The synchronization processing apparatus includes an obtaining unit, configured to obtain a skeleton set and a synchronization task set, the skeleton set being used for storing M blocks to be synchronized by the first node device, the skeleton set including P skeletons, the synchronization task set including P synchronization tasks, the P skeletons being in a one-to-one correspondence to the P synchronization tasks, and M and P both being positive integers; a processing unit, configured to select a second node device from the candidate node set, the second node device being at least one candidate node device in the candidate node set; concurrently transmit synchronization tasks in the synchronization task set to the second node device, so that the second node device performs the synchronization tasks and returns the M blocks; and fill the M blocks into the skeletons in the skeleton set.

According to one aspect, an embodiment of this application provides a synchronization processing device, the synchronization processing device being a first node device in a blockchain network, the blockchain network including a candidate node set, the candidate node set including a plurality of candidate node devices connected to the first node device, and the synchronization processing device including a memory and a processor coupled to the memory. The processor is configured to perform: obtaining a skeleton set and a synchronization task set, the skeleton set being used for storing M blocks to be synchronized by the first node device, the skeleton set comprising P skeletons, the synchronization task set comprising P synchronization tasks, the P skeletons being of a one-to-one correspondence to the P synchronization tasks, and M and P both being positive integers; selecting a second node device from the candidate node set, the second node device being a candidate node device in the candidate node set; concurrently transmitting synchronization tasks in the synchronization task set to the second node device, the second node device performing the synchronization tasks and returning the M blocks; and filling the M blocks into the skeletons in the skeleton set.

According to one aspect, an embodiment of this application provides a non-transitory computer storage medium, storing one or more computer instructions, when executed by a computer, causing the computer to perform the synchronization processing method according to the foregoing aspect.

In the embodiments of this application, when performing synchronization processing, the first node device obtains a skeleton set and a synchronization task set, the skeleton set being used for storing M blocks to be synchronized by the first node device; selects a second node device from a candidate node set, the second node device being at least one candidate node device in the candidate node set; concurrently transmits synchronization tasks in the synchronization task set to the second node device, so that the second node device performs the synchronization tasks and returns the M blocks; and then fills the M blocks into the skeletons in the skeleton set. Through the synchronization processing method of skeleton filling, synchronization tasks corresponding to a plurality of skeletons can be concurrently transmitted during one synchronization processing, so that more blocks can be synchronized at one time based on the plurality of skeletons, which improves the synchronization processing efficiency.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from the accompanying drawings without creative efforts.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

The embodiments of this application relate to blockchain technologies. Blockchain is a set of decentralized infrastructure with distributed storage characteristics. Specifically, the blockchain is a data structure including data blocks in a chronological order in a structure similar to a linked list, which can safely store sequential data that can be verified in a system, and cryptographically ensure that the data cannot be tampered with or forged.

Figure 1:
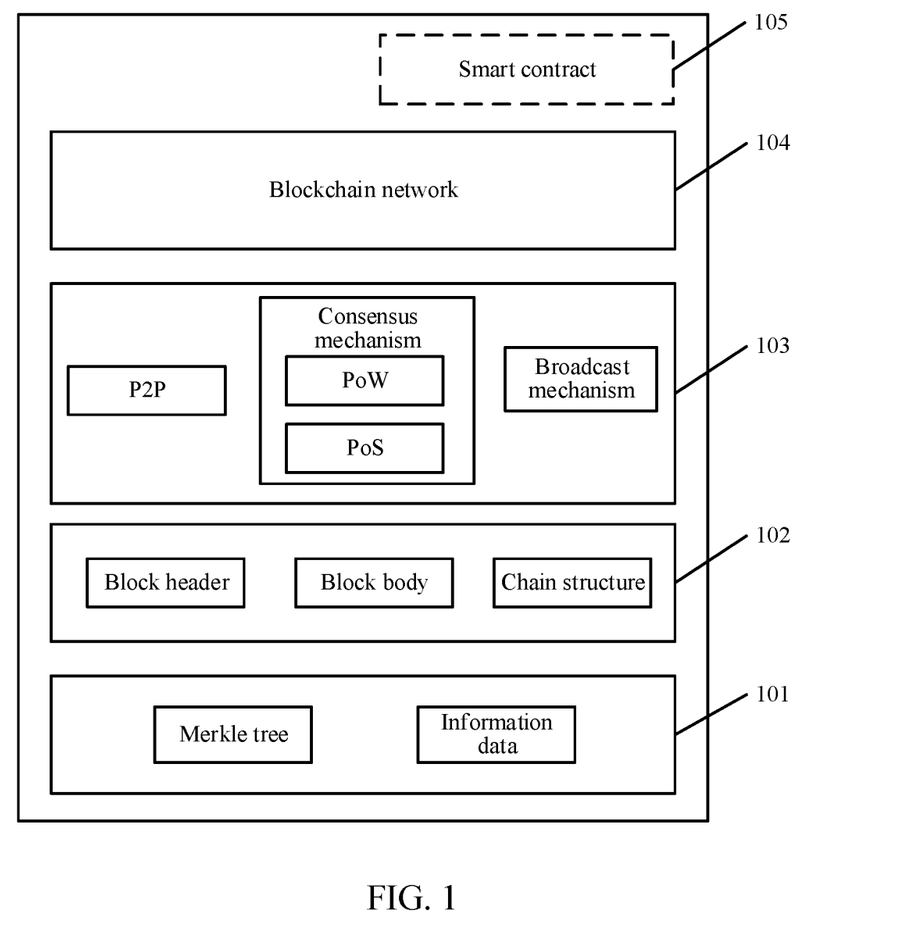
FIG. 1 is a diagram of a blockchain according to an exemplary embodiment of this application.

FIG. 1 is a diagram of a blockchain according to an exemplary embodiment of this application. As shown in FIG. 1, an environment of the blockchain mainly includes a total of five layered structures 101 to 105 in a bottom-up order.

(1) Information data and a Merkle tree are located at the bottom layer 101. The information data herein is raw data that is requested to be published to a blockchain network, but has not formed a block. For example, the information data may be service data or transaction data. The raw data needs to be further processed (for example, verified by nodes in the blockchain network, and hashed) before being written into the block. The Merkle tree is an important component of the blockchain technologies. The blockchain does not directly store the raw data in plaintext, and the raw data needs to be hashed and stored in a form of a hash value. The Merkel tree is used for organizing the hash value formed by the plurality of pieces of hashed raw data in a binary tree structure and store the hash value in a block body of the block.

Figure 2:
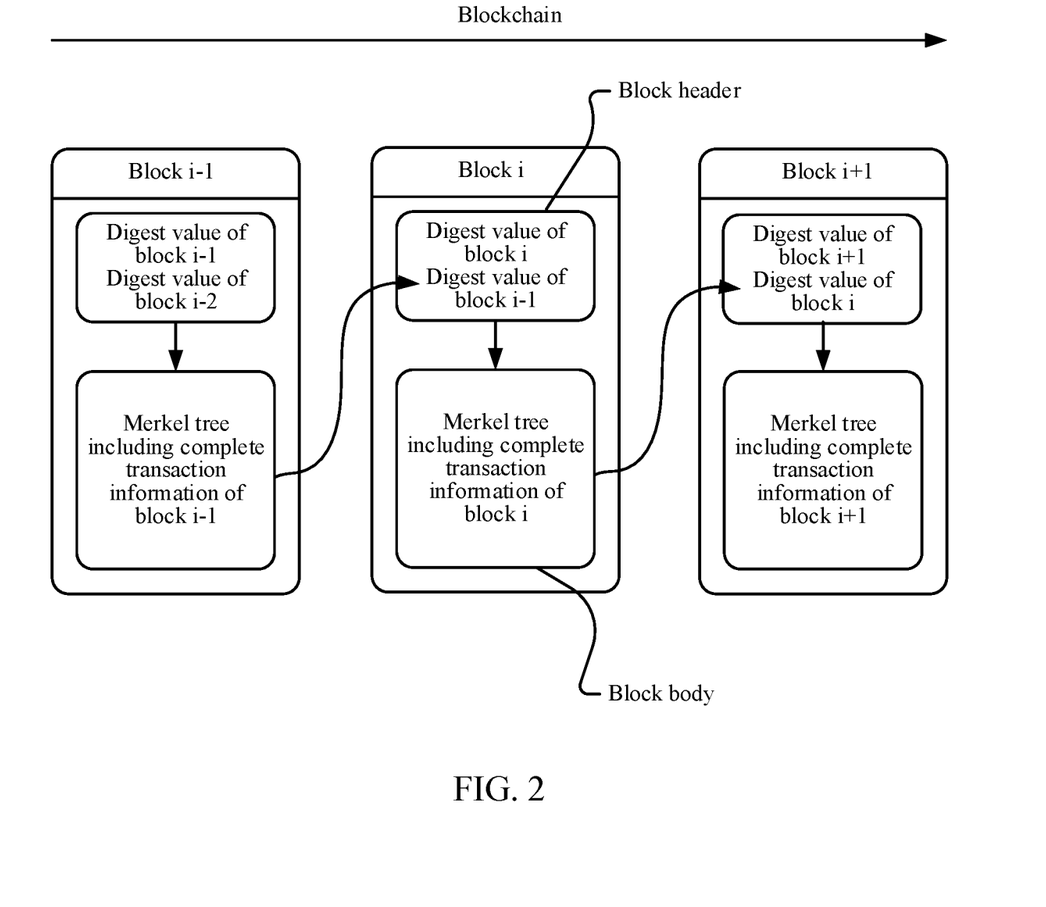
FIG. 2 is a schematic structural diagram of a blockchain according to an exemplary embodiment of this application.

(2) The block is located at the layer 102. The block is a data block, and the information data of the bottom layer 101 is further processed and then written into a block in the layer 102. The plurality of blocks are sequentially connected into a chain structure to form a blockchain. In the chain structure, a previous block has a parent-child relationship with a next adjacent block. FIG. 2 is a schematic structural diagram of a blockchain according to an exemplary embodiment of this application. As shown in FIG. 2, a block i−1 (i is a positive integer), a block i, and a block i+1 are sequentially connected into a chain structure. The block i is divided into two parts: a block header and a block body. The block header includes a digest value of the previous block i−1 and a digest value of the block i (that is, a Merkle root of the block). The block body includes complete data of the block i and is organized in a form of the Merkle tree. The block i−1 has a parent-child relationship with the block i, that is, the block i−1 is a parent block of the block i, and the block i is a child block of the block i−1. Similarly, the block i is a parent block of the block i+1, and the block i+1 is a child block of the block i.

(3) Protocols and mechanisms followed by the blockchain are located at the layer 103. The protocols may include: a peer-to-peer (P2P) protocol; and the mechanisms may include but are not limited to a broadcast mechanism and a consensus mechanism (including core mechanisms such as a proof of work (POW) mechanism and a proof of stake (POS) mechanism).

(4) The blockchain network is located at the layer 104. The blockchain network includes a plurality of node devices. The node device may be a computer device, including but not limited to a personal computer (PC), a server, a mining machine, a smartphone, a tablet computer, a mobile computer, or the like. The node devices in the blockchain network are networked in a P2P method, and the node devices communicate with each other according to the P2P protocol. The node devices jointly follow the broadcast mechanism and the consensus mechanism (including core mechanisms such as a POW mechanism and a POS mechanism) to jointly ensure immutability and unforgeability of data on the blockchain, and implement decentralization and trustlessness of the blockchain.

(5) A smart contract is located at the upper layer 105. The smart contract is a set of scenario-responsive procedural rules and logic, and is a decentralized and information-sharing program code deployed in the blockchain. Parties that sign the contract reach an agreement on the content of the contract and the contract is deployed in the blockchain in a form of the smart contract, which means that the contract can be automatically performed on behalf of each signatory without relying on any central agency.

Types of the blockchain may include: a public blockchain, a private blockchain, and a consortium blockchain. The public blockchain is open to the public, and anyone can join and access the blockchain. Blocks on the public blockchain can be viewed by anyone, and anyone can initiate transactions on the public blockchain and can participate in a consensus process of the public blockchain at any time. The private blockchain is only used inside a private organization, and read and write permissions and an accounting permission on the blockchain are made according to rules of the private organization. The private blockchain is usually used for data management and auditing inside an enterprise. Only consortium members can participate in the consortium blockchain, and read and write permissions and an accounting permission on the blockchain are made according to consortium rules. The consortium blockchain is generally used in scenarios such as inter-institutional transactions, settlement, or clearing. The environment of the blockchain shown in FIG. 1 is the basis for the development of various types of blockchains. It may be understood that there are also some differences in networking methods of blockchain networks corresponding to different types of blockchains. Because the blockchain has characteristics of decentralization, distributed storage, and immutability and unforgeability of data, more service activities (such as lending activities and financial transaction activities) are carried out based on blockchain technologies to make use of the characteristics of the blockchain to ensure fairness and openness of the service activities.

Figure 3:
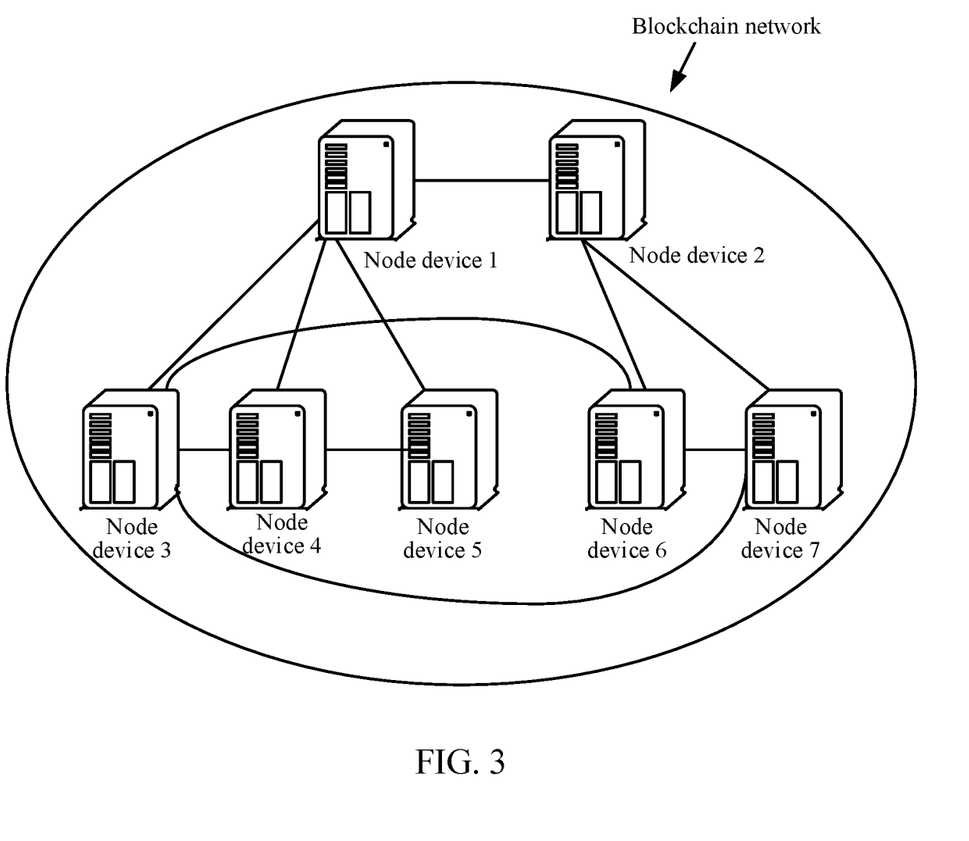
FIG. 3 is a schematic architectural diagram of a blockchain network according to an exemplary embodiment of this application.
Figure 4:
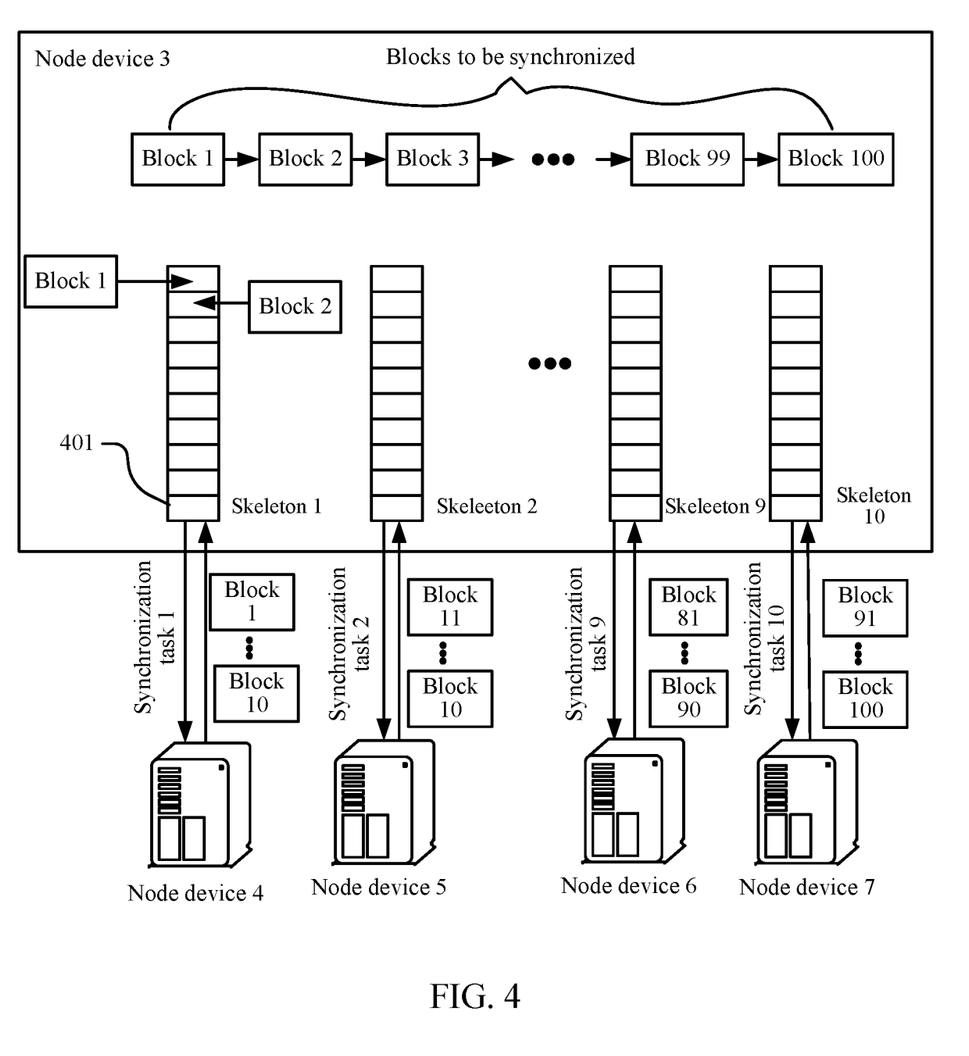
FIG. 4 is a schematic structural diagram of a skeleton according to an exemplary embodiment of this application.

FIG. 3 is a schematic architectural diagram of a blockchain network according to an exemplary embodiment of this application. The blockchain network includes a plurality of node devices (7 node devices are used in the figure as an example for description). As shown in FIG. 4, a node device 1 and a node device 2 are consensus node devices, and a node device 3 to a node device 7 are all synchronization node devices. The consensus node device is a node device that can not only perform a block synchronization process, but also participate in a block consensus process. The synchronization node device is a node device that can only perform the block synchronization process but cannot participate in the block consensus process.

The blockchain is a distributed application mode, and each node device in the blockchain network stores one blockchain. Specifically, in the blockchain network shown in FIG. 3, the node device 1 stores a blockchain 1 in a storage space of the node device 1, the node device 2 stores a blockchain 2 in a storage space of the node device 2, the node device 3 stores a blockchain 3 in a storage space of the node device 3, and so on. Due to differences in network connection performances, differences in processing performances, and time differences in joining the blockchain network, there are differences between the blockchains stored in the node devices in the blockchain network, and the node devices in the blockchain network need to perform synchronization or other means to maintain the consistency between the blockchains stored in the node devices. For example, there are already n (n is a positive integer) node devices in the blockchain network, and a node device n+1 is newly added to the blockchain network. For the node device n+1, no block has been stored in a storage space of the node device n+1, and a block height of a blockchain n+1 of the node device n+1 is 0. For a node device n that already exists in the blockchain network, the node device n may have stored 10001 blocks, and a block height of the blockchain n stored in a storage space of the node device n may be 10000. Therefore, the node device n+1 lags behind the node device n, and the node device n+1 needs to perform a block synchronization process to obtain all blocks between the block height 0 and the block height 10000 to update the blockchain n+1 of the node device n+1 to catch up with the node device n. In actual application, a new block generated in the blockchain network needs to be reached consensus by the consensus node device first. After consensus is reached, the consensus node device adds the new block to the blockchain locally stored in the consensus node device. The synchronization node device in the blockchain network then obtains the new block from the consensus node device and adds the new block to the blockchain locally stored in the synchronization node device to complete the block synchronization process. Based on this, it is generally recognized that the blockchain stored in the consensus node device is the longest (or most complete) blockchain in the blockchain network, and the blockchain stored in the consensus node device can be used as a reference blockchain during the synchronization processing.

Based on the architecture of the blockchain network shown in FIG. 3, this embodiment of this application provides a synchronization processing solution, which introduces a concept of a skeleton. FIG. 4 is a schematic structural diagram of a skeleton according to an exemplary embodiment of this application. The skeleton is a data structure. One skeleton includes a plurality of data units 401, and each data unit is configured to store a block. Referring to the example shown in FIG. 4, assuming that any node device in the blockchain network (assuming being the node device 3 shown in FIG. 3) needs to synchronize 100 blocks: a block 1 to a block 100, the synchronization processing of the node device 3 may include the following step (1) to step (4):

(1) Construct a skeleton set according to blocks to be synchronized, where the skeleton set includes one or more skeletons.

As shown in FIG. 4, it is assumed that the skeleton set includes a total of 10 skeletons, each skeleton includes 10 data units 401, and the data units 401 are reserved for storing synchronization blocks after the node device 3 obtains the synchronization blocks. Using a skeleton 1 as an example, the skeleton 1 includes 10 data units 401, the data units are sequentially arranged, the first data unit is configured to store a block 1, the second data unit is configured to store a block 2, and so on. In the skeleton set, the quantities of data units included in the skeletons may be the same. As shown in FIG. 4, each skeleton may include 10 data units. Certainly, the quantities of data units included in the skeletons may also be different. For example, in FIG. 4, the skeleton 1 may include 10 data units, a skeleton 2 may include 5 data units, a skeleton 3 may include 15 data units, and the like. The node device 3 can set the quantity of the skeletons and the quantity of the data units included in the skeleton according to an actual situation. The actual situation herein may include but is not limited to the quantity and processing capabilities of the node devices in a candidate node set, an actual concurrent transmission processing capability of the node device 3, or the like.

(2) Create a synchronization task set for the skeleton set, where the synchronization task set includes one or more synchronization tasks, and one skeleton corresponds to one synchronization task.

As shown in FIG. 4, the skeleton 1 corresponds to a synchronization task 1, the skeleton 2 corresponds to a synchronization task 2, the skeleton 3 corresponds to a synchronization task 3, and so on. The synchronization task corresponding to each skeleton is used for indicating to return a plurality of blocks used by the skeleton for storage. For example, the synchronization task 1 corresponding to the skeleton 1 is used for indicating to return the block 1 to a block 10 used by the skeleton 1 for storage to the node device 3. In another example, the synchronization task 2 corresponding to the skeleton 2 is used for indicating to return a block 11 to a block 20 used by the skeleton 2 for storage to the node device 3. It may be understood that the synchronization task carries indication information, and the indication information may include indexes of blocks corresponding to the first and last two data units in the skeleton. The index herein may be a hash value of the block, or a generation timestamp of the block, or a block height corresponding to the block. In this way, after receiving the synchronization task, another node device returns the two blocks in the skeleton and all the blocks between the two blocks to the node device 3 according to the indexes of the two blocks in the indication information. The indication information may also include indexes of all blocks used by the skeleton for storage, so that after receiving the synchronization task, another node device returns all needed blocks to the node device 3 according to the indexes of all the needed blocks.

(3) Select a second node device, where the second node device is at least one node device that is in a blockchain network and that is connected to a first node device and configured to perform a synchronization task.

First, a candidate node set is determined, where the candidate node set includes a candidate node device directly connected to the node device 3. As shown in FIG. 3, the candidate node set of the node device 3 includes the node device 1 and the node device 4 to the node device 7. The node device 1 is a consensus node device and further needs to perform a consensus task. Therefore, to avoid imposing processing burden on the node device 1, and to improve the synchronization efficiency, the node device 4 to the node device 7 can be selected from the candidate node set as the second node device to perform the synchronization task. Next, the corresponding second node device is matched for each synchronization task, where the matching mainly has the following policies:

Policy 1: Match according to a storage situation. The synchronization task is matched for the second node device storing a corresponding block. For example, if the synchronization task 1 requires synchronizing the block 1 to the block 10, the second node device storing the block 1 to the block 10 is selected to perform the synchronization task 1. In another example, if the synchronization task 2 requires synchronizing the block 81 to the block 90, the second node device storing the block 81 to the block 90 is selected to perform the synchronization task 2.

Policy 2: Match according to a processing performance. According to the processing performance, one of a plurality of second node devices can be selected to perform a synchronization task. For example, if a processing performance of the node device 4 is better than a processing performance of the node device 5, the node device 4 can be selected to perform the synchronization task 1. The processing performance includes but is not limited to a CPU processing speed, a concurrent transmission processing capacity, a network bandwidth resource, or the like. The higher the processing performance, the higher the degree of execution, and the faster the synchronization task can be performed.

Policy 3: Match according to a trust degree. The trust degree is information used for describing a degree of trustworthiness of a node device. The higher the trust degree, the higher the degree of trustworthiness of the node device. Generally, a trust degree of a node device used by an official organization is higher than a trust degree of a node device used by a non-official organization. In one embodiment, the trust degree may be expressed by scores. For example, a score range of the trust degree includes [0, 10], and the higher the score of the trust degree, the higher the degree of trustworthiness. In another embodiment, the trust degree may be expressed by levels. For example, the trust degree includes three levels: high, medium, and low, and the degree of trustworthiness of the three levels sequentially decreases. According to the trust degree, one of the plurality of second node devices can be selected to perform a synchronization task. For example: if a trust degree of the node device 4 is higher than a trust degree of the node device 5, the node device 4 can be selected to perform the synchronization task 1.

One synchronization task is performed by one node device, and one node device can perform a plurality of synchronization tasks. It may be understood that the foregoing policies are not exhaustive, and the embodiments of this application may also be applied to other policies, for example: a random matching policy, that is, one of the plurality of second node devices can be randomly selected to perform a synchronization task; and in another example, a weighted average policy, that is, weights can be set for a plurality of impact factors (a storage status factor, a trust degree factor, and a processing performance factor) respectively, and one of the plurality of second node devices can be selected in a weighted average method to perform the synchronization task. In addition, in the foregoing policy 2 and policy 3, if the second node device selected to perform a synchronization task does not store a to-be-synchronized block indicated by the synchronization task, the second node device can obtain the block from another node device (for example, the consensus node device) in the blockchain network and return the block to the first node device. For example: the synchronization task 1 requires synchronizing the block 1 to the block 10. Through the policy 2 or the policy 3, the node device 4 is selected to perform the synchronization task 1, but the node device 4 does not store the block 1 to the block 10. Therefore, the node device 4 can obtain the block 1 to the block 10 from the consensus node device and return the block 1 to the block 10 to the first node device.

(4) Concurrently transmit the plurality of synchronization tasks to the second node device, so that the second node device performs the synchronization tasks.

For example, as shown in FIG. 4, assuming that the synchronization task 1 and the synchronization task 3 are performed by the node device 4, the synchronization task 2, a synchronization task 4, and a synchronization task 6 are performed by the node device 5, a synchronization task 5, the synchronization task 6, and a synchronization task 9 are performed by the node device 6, and a synchronization task 7, a synchronization task 8, and a synchronization task 10 are performed by the node device 7. Therefore, the node device 3 can concurrently transmit the 10 synchronization tasks at one time, and the second node devices (that is, node device 4, node device 5, node device 6, and node device 7) can internally perform the synchronization tasks in a serial or parallel method. The blocks required by the node device 3 are returned to the node device 3, so that the node device 3 can obtain the to-be-synchronized block during one synchronization processing.

(5) Fill the blocks returned by the second node device into the skeletons in the skeleton set.

For example, as shown in FIG. 4, the block 1 to the block 10 returned by the node device 4 performing the synchronization task 1 are filled into the data units of the skeleton 1; and a block 21 to a block 30 returned by the node device 4 performing the synchronization task 3 are filled into the data units of the skeleton 3. After the skeletons are completely filled, the first node device can sequentially (for example, in an order of generation timestamps of the blocks) add the blocks stored in the skeletons to a local blockchain of the first node device, thereby achieving an update of the local blockchain of the first node device.

If a synchronization task adopts any policy but does not match the second node device that needs to perform the synchronization task correspondingly, for example, no node device in the candidate node set completely stores the blocks required by a skeleton, it is possible that the skeleton is not properly constructed, and it can be considered to rebuild the skeleton and re-update the synchronization task. Certainly, it can also be compatible with an existing synchronization method, and the blocks required by the skeleton corresponding to the synchronization task that does not match the node device are synchronized one by one.

The synchronization processing solution for skeleton filling provided in the embodiments of this application is based on one synchronization task corresponding to one skeleton, which can synchronize the plurality of blocks at one time, effectively improving the synchronization processing efficiency. Further, synchronization tasks corresponding to a plurality of skeletons can be concurrently transmitted during one synchronization processing, so that more blocks can be synchronized at one time based on the plurality of skeletons, which further improves the synchronization processing efficiency.

Figure 5:
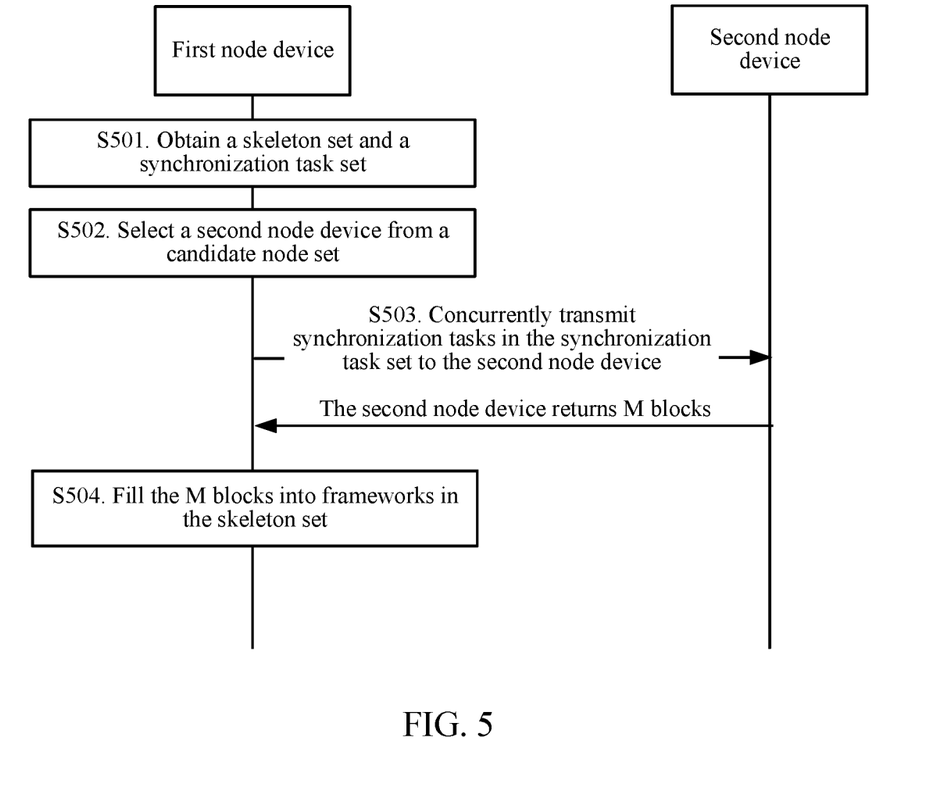
FIG. 5 is a flowchart of a synchronization processing method according to an exemplary embodiment of this application.

FIG. 5 is a flowchart of a synchronization processing method according to an exemplary embodiment of this application. The method is performed by a first node device in a blockchain network, and the first node device may be any node device in the blockchain network. Subsequent embodiments of this application are described by using an example in which the first node device is the node device 3 in the blockchain network shown in FIG. 3. The blockchain network includes a candidate node set, and the candidate node set includes a plurality of candidate node devices connected to the first node device. The method includes the following steps S501 to S504:

S501. Obtain a skeleton set and a synchronization task set, the skeleton set being used for storing M blocks to be synchronized by a first node device. The skeleton set includes P skeletons, the synchronization task set includes P synchronization tasks, and one skeleton corresponds to one synchronization task. M and P both are positive integers.

Using any skeleton in the skeleton set as an example, the any skeleton is represented as a target skeleton. The target skeleton includes N data units, the N data units are configured to store N blocks to be synchronized by the first node device, the N blocks are in one-to-one correspondence to the N data units, and N is a positive integer and N≤M. The N data units in the target skeleton are sequentially arranged, and the N blocks are consecutive blocks in the blockchain network. An $i^{th}$ data unit among the N data units is configured to store an $i^{th}$ block among the N blocks; and i is a positive integer and 1≤i≤N. Referring to the example shown in FIG. 4, the target skeleton may be any one of a skeleton 1 to a skeleton 10. Using the target skeleton being the skeleton 1 as an example, N is 10, the first data unit of the target skeleton is configured to store a block 1, the second data unit of the target skeleton is a block 2, and so on. The target skeleton corresponds to a target synchronization task, the target synchronization task carries indication information, and the indication information may include indexes of blocks corresponding to the first and last two data units in the target skeleton. The index herein may be a hash value of the block, or a generation timestamp of the block, or a block height corresponding to the block. The indication information may also include indexes of all blocks used by the target skeleton for storage. Using the target skeleton being the skeleton 1 shown in FIG. 4 as an example, the target synchronization task may include indication information, and the indication information may include indexes of the block 1 and the block 10 and may also include indexes of the block 1 to the block 10.

It may be understood that in this embodiment of this application, a sequential arrangement of the data units of the target skeleton is only an example, and the data units of the target skeleton may also be arranged out of order. Certainly, the N blocks stored in the target skeleton may not be consecutive blocks; or, the data units in the target skeleton may not sequentially store the N blocks. In this case, the indication information included in the target synchronization task may only need to include indexes of the N blocks.

S502. Select a second node device from the candidate node set.

The second node device is at least one node device that is in the candidate node set and that is configured to perform a synchronization task. In this step, the foregoing policy may be used to select the second node device, and the policy may include but is not limited to any one of the following: The second node device is selected according to a storage status matching method, a processing performance matching method, and a trust degree matching method.

S503. Concurrently transmit synchronization tasks in the synchronization task set to the second node device, so that the second node device performs the synchronization tasks and returns the M blocks.

The concurrent transmission herein includes one-time concurrent transmission and concurrent transmission in batches. The so-called one-time concurrent transmission means that the first node device can transmit all synchronization tasks in the synchronization task set to the second node device at one time, so that all needed blocks can be synchronized at one time. The so-called concurrent transmission in batches means that the first node device divides the synchronization tasks in the synchronization task set into batches, and concurrently transmits the synchronization tasks in batches. A batch division method may be, for example, according to an order of the blocks, and a batch of a synchronization task corresponding to a block with a former index is prior to a batch of a synchronization task corresponding to a block with a later index.

S504. Fill the M blocks into the skeletons in the skeleton set.

A filling process is a process of storing the block in the corresponding data unit. The first node device sequentially fills the M blocks returned by the second node device into the data units of the skeletons. Using the target skeleton as an example, it is assumed that the target skeleton corresponds to the target synchronization task, the target skeleton is any skeleton in the skeleton set, and the target synchronization task is anyone in the synchronization task set. A target second node device is a second node device selected for the target synchronization task in S502. After the target synchronization task is transmitted to the target second node device through S503, the target second node device performs the target synchronization task and returns the N blocks to the first node device; and the first node device respectively fills the N blocks into the N data units of the target skeleton.

In the embodiments of this application, when performing synchronization processing, the first node device obtains a skeleton set and a synchronization task set, the skeleton set being used for storing M blocks to be synchronized by the first node device; selects a second node device from a candidate node set, the second node device being at least one candidate node device in the candidate node set; concurrently transmits synchronization tasks in the synchronization task set to the second node device, so that the second node device performs the synchronization tasks and returns the M blocks; and then fills the M blocks into the skeletons in the skeleton set. Through the synchronization processing solution for skeleton filling, based on one synchronization task corresponding to one skeleton, the plurality of blocks can be synchronized at one time, effectively improving the synchronization processing efficiency. Synchronization tasks corresponding to a plurality of skeletons can be concurrently transmitted during one synchronization processing, so that more blocks can be synchronized at one time based on the plurality of skeletons, which further improves the synchronization processing efficiency.

Figure 6:
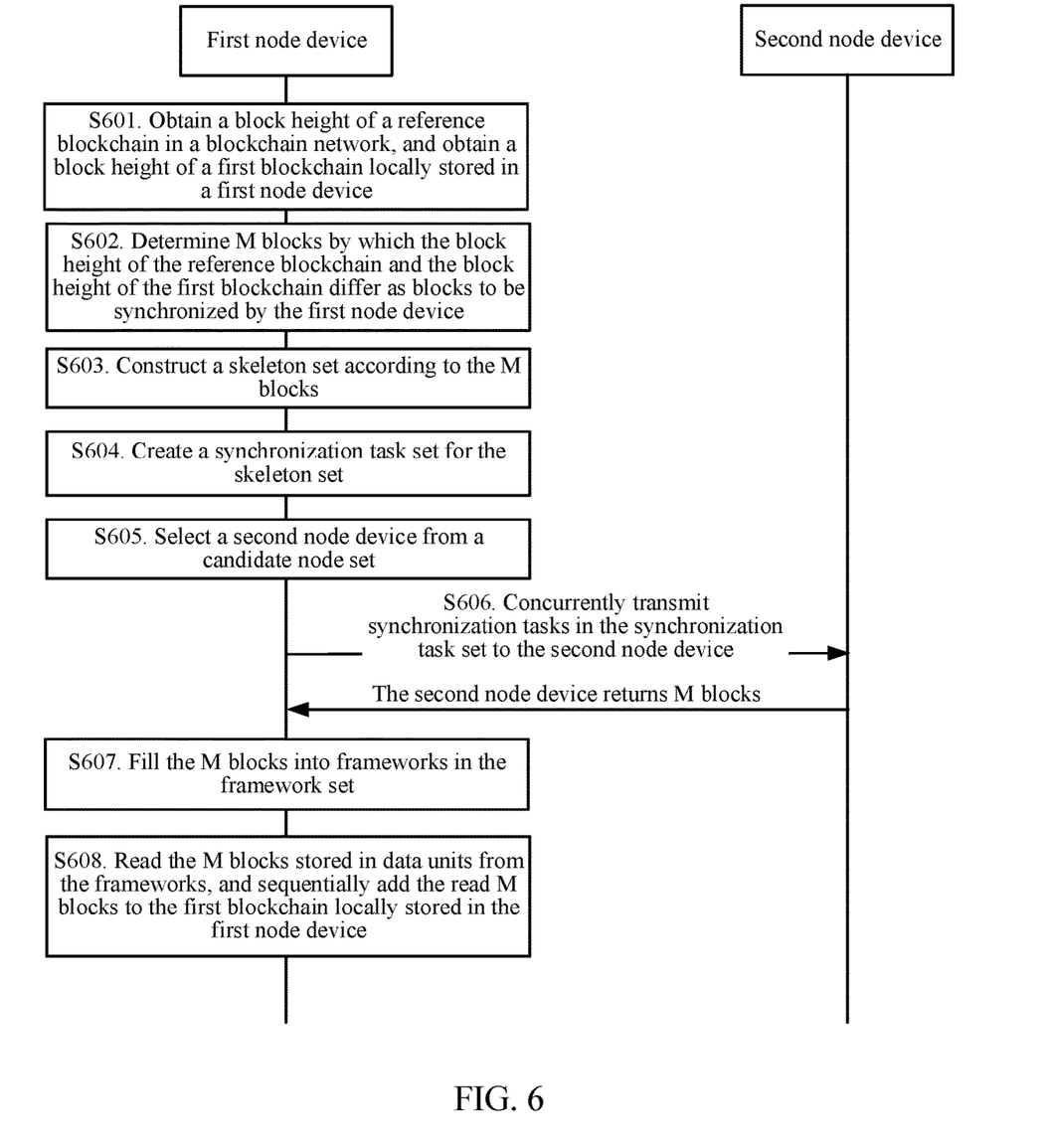
FIG. 6 is a flowchart of another synchronization processing method according to an exemplary embodiment of this application.

FIG. 6 is a flowchart of another synchronization processing method according to an exemplary embodiment of this application. The method is performed by a first node device in a blockchain network, and the first node device may be any node device in the blockchain network. Subsequent embodiments of this application are described by using an example in which the first node device is the node device 3 in the blockchain network shown in FIG. 3. The blockchain network includes a candidate node set, and the candidate node set includes a plurality of candidate node devices connected to the first node device. The method includes the following steps S601 to S608:

S601. Obtain a block height of a reference blockchain in the blockchain network, and obtain a block height of a first blockchain locally stored in the first node device.

The reference blockchain refers to the longest (or most complete) blockchain in blockchains stored in node devices in the blockchain network, and usually is a blockchain stored in a consensus node device. The block height is used for indicating the quantity of blocks connected on the blockchain. The block height is an identifier of the block, and may be used for indicating a position of the block in the blockchain. A block height of a founding block in the blockchain is 0 by default, a block height of the first block after the founding block is 1 (the first block is referred to as a block 1 for short), a block height of the second block after the founding block is 2 (the second block is referred to as a block 2), and so on. For example, a block height of a current block of the reference blockchain is 100 (the current block may be referred to as a block 100 for short), which means that 100 blocks have been stacked on the founding block, that is, the quantity of the blocks on the reference blockchain formed between the founding block and the block 100 is 101.

S602. Determine M blocks by which the block height of the reference blockchain and the block height of the first blockchain differ as blocks to be synchronized by the first node device, where M is a positive integer.

Assuming that the block height of the reference blockchain is 200, and the block height of the first blockchain is 100, the 100 blocks by which the reference blockchain and the first blockchain differ include a block 101 to a block 200, and the 100 blocks in the difference are the blocks to be synchronized by the first node device, that is, M=100 in this case.

S603. Construct a skeleton set according to the M blocks. The skeleton set includes P skeletons, where P is a positive integer. For construction of the skeleton set, reference may be made to the example shown in FIG. 4, and details are not repeated herein.

S604. Create a synchronization task set for the skeleton set, the synchronization task set including P synchronization tasks, and one skeleton corresponding to one synchronization task.

S605. Select a second node device from the candidate node set, the second node device being at least one candidate node device in the candidate node set.

In one embodiment, corresponding to the foregoing policy 1, that is, in S605, the second node device can be selected from the candidate node set according to a storage status matching method. The selection process in S605 may include the following steps s21 to s22:

s21. Receive block storage statements of the candidate node devices in the candidate node set.

The block storage statements include a block storage status of the candidate node device. For example, if a block storage statement of a candidate node device includes indexes of a block 1 to a block 10, it indicates that the candidate node device states that the candidate node device stores the block 1 to the block 10.

s22. Select at least one candidate node device from the candidate node set as the second node device according to the block storage statements of the candidate node devices in the candidate node set.

In this step, for a synchronization task, the node device that states that the node device stores the block indicated by the synchronization task can be determined as the second node device that performs the synchronization task, so as to ensure that the second node device can perform the synchronization task and can return the block indicated by the synchronization task. In s21 to s22, the second node device is selected according to the block storage status, which can increase the probability of the synchronization task being successfully performed and increase the success rate of synchronization processing.

In one embodiment, corresponding to the foregoing policy 2, that is, in S605, the second node device can be selected from the candidate node set according to a processing performance matching method. The selection process in S605 may include the following steps s23 to s24:

s23. Obtain processing performances of the candidate node devices in the candidate node set.

s24. Determine at least one candidate node device whose processing performance in the candidate node set is better than a performance threshold as the second node device.

In s23 to s24, the processing performance includes but is not limited to a CPU processing speed, a concurrent transmission processing capacity, a network bandwidth resource, or the like. The higher the processing performance, the higher the degree of execution, and the second node device can assist the first node device in performing the synchronization processing faster, which can enhance the security of the synchronization processing. The performance threshold may be set according to an actual situation. For example: the performance threshold may be an average value of processing performances of the candidate node devices in the candidate node set, that is, at least one candidate node device whose processing performance is higher than the average value can be determined as the second node device.

In one embodiment, corresponding to the foregoing policy 3, that is, in S605, the second node device can be selected from the candidate node set according to a trust degree matching method. The selection process in S605 may include the following steps s25 to s26:

s25. Obtain trust degrees of the candidate node devices in the candidate node set.

s26. Determine at least one candidate node device whose trust degree in the candidate node set is higher than a trust threshold as the second node device.

In s25 to s26, the trust degree is used for describing a degree of trustworthiness of the node device, and the higher the trust degree, the more reliable the node device. The trust threshold may be set according to an actual situation. For example, the trust threshold may be 5 points, and at least one candidate node device with a score of the trust degree higher than 5 points can be determined as the second node device. The second node device is selected according to the trust degree, which can prevent some malicious nodes from interfering with the synchronization processing and enhance the security of the synchronization processing.

S606. Concurrently transmit synchronization tasks in the synchronization task set to the second node device, so that the second node device performs the synchronization tasks and returns the M blocks.

S607. Fill the M blocks into the skeletons in the skeleton set.

S608. Read the M blocks stored in the data units from the skeletons, and sequentially add the read M blocks to a first blockchain locally stored in the first node device.

After the skeletons are completely filled, the first node device can sequentially (for example, in an order of generation timestamps of the blocks) add the blocks stored in the skeletons to a local blockchain of the first node device, thereby achieving an update of the local blockchain of the first node device. Using the target skeleton as an example, the first node device reads N blocks sequentially stored in N data units from the target skeleton, and adds the read N blocks to the first blockchain locally stored in the first node device. The skeleton is a data structure. After the N blocks are stored in the target skeleton, the N blocks are sequentially read and added to the first blockchain locally stored in the first node device, so that the N blocks are successfully updated on the first blockchain. When blocks of all the skeletons in the skeleton set are sequentially added to the first blockchain, the first node device can complete synchronization of all the blocks and catch up with another node device in the blockchain network in time.

In the embodiments of this application, when performing synchronization processing, the first node device obtains a skeleton set and a synchronization task set, the skeleton set being used for storing M blocks to be synchronized by the first node device; selects a second node device from the candidate node set; concurrently transmits synchronization tasks in the synchronization task set to the second node device, so that the second node device performs the synchronization tasks and returns the M blocks; and then fills the M blocks into the skeletons in the skeleton set. Through the synchronization processing solution for skeleton filling, based on one synchronization task corresponding to one skeleton, the plurality of blocks can be synchronized at one time, effectively improving the synchronization processing efficiency. Synchronization tasks corresponding to a plurality of skeletons can be concurrently transmitted during one synchronization processing, so that more blocks can be synchronized at one time based on the plurality of skeletons, which further improves the synchronization processing efficiency.

Figure 7:
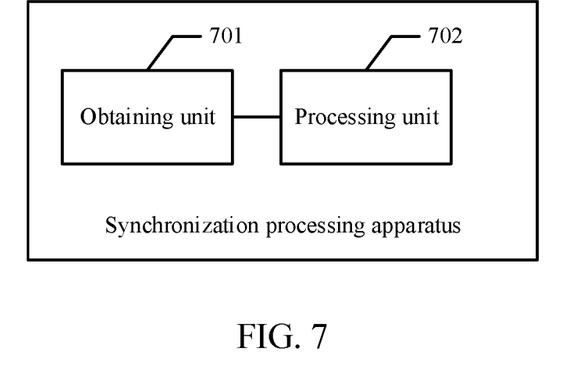
FIG. 7 is a schematic structural diagram of a synchronization processing apparatus according to an exemplary embodiment of this application.

FIG. 7 is a schematic structural diagram of a synchronization processing apparatus according to an exemplary embodiment of this application. The synchronization processing apparatus is disposed in a first node device in a blockchain network. Specifically, the synchronization processing apparatus may be a computer program (including program code) running in the first node device. For example, the synchronization processing apparatus may be application software in the first node device. The synchronization processing apparatus may be configured to perform corresponding steps in the embodiments shown in FIG. 5 to FIG. 6. The first node device may be any node device in the blockchain network. For example, the first node device is a node device in the blockchain network shown in FIG. 3. The blockchain network includes a candidate node set, and the candidate node set includes a plurality of candidate node devices connected to the first node device. As shown in FIG. 7, the synchronization processing apparatus includes:

an obtaining unit 701, configured to obtain a skeleton set and a synchronization task set, the skeleton set being used for storing M blocks to be synchronized by the first node device; the skeleton set including P skeletons, the synchronization task set including P synchronization tasks, the P skeletons being in a one-to-one correspondence to the P synchronization tasks, and M and P both being positive integers;

a processing unit 702, configured to select a second node device from the candidate node set, the second node device being at least one candidate node device in the candidate node set; concurrently transmit synchronization tasks in the synchronization task set to the second node device, so that the second node device performs the synchronization tasks and returns the M blocks; and fill the M blocks into the skeletons in the skeleton set.

In one embodiment, the skeleton set includes a target skeleton, and the target skeleton is any one of the P skeletons; and the target skeleton includes N data units, the N data units are configured to store N blocks to be synchronized by the first node device, the N blocks are in a one-to-one correspondence to the N data units, and N is a positive integer and $N \leq M$.

In one embodiment, The N data units in the target skeleton are sequentially arranged, and the N blocks are consecutive blocks in the blockchain network. An $i^{th}$ data unit among the N data units is configured to store an $i^{th}$ block among the N blocks; and i is a positive integer and $1 \leq i \leq N$.

In one embodiment, a target second node device is any one of the second node devices; the target second node device is configured to perform a target synchronization task corresponding to the target skeleton, and return the N blocks to the first node device; and a specific method for the first node device to fill the N blocks into the target skeleton is: respectively filling the N blocks into the N data units of the target skeleton.

In one embodiment, the processing unit 702 is further configured to:
read the N blocks stored in the N data units from the target skeleton, and sequentially add the read N blocks to a first blockchain locally stored in the first node device.

In one embodiment, the processing unit 702 is specifically configured to:
obtain trust degrees of the candidate node devices in the candidate node set; and
determine at least one candidate node device whose trust degree in the candidate node set is higher than a trust threshold as the second node device.

In one embodiment, the processing unit 702 is specifically configured to:
obtain processing performances of the candidate node devices in the candidate node set; and
determine at least one candidate node device whose processing performance in the candidate node set is better than a performance threshold as the second node device.

In one embodiment, the processing unit 702 is specifically configured to:
receive block storage statements of the candidate node devices in the candidate node set; and
select at least one candidate node device from the candidate node set as the second node device according to the block storage statements of the candidate node devices in the candidate node set.

In one embodiment, the obtaining unit 701 is specifically configured to:

obtain a block height of a reference blockchain in the blockchain network, and obtain a block height of a first blockchain locally stored in the first node device;

determine M blocks by which the block height of the reference blockchain and the block height of the first blockchain differ as blocks to be synchronized by the first node device; and construct a skeleton set according to the M blocks.

According to an embodiment of this application, the units of the synchronization processing apparatus shown in FIG. 7 may be separately or wholly combined into one or several other units, or one (or more) of the units herein may further be divided into a plurality of units of smaller functions. In this way, same operations can be implemented, and implementation of the technical effects of the embodiments of this application is not affected. The foregoing units are divided based on logical functions. In actual application, a function of one unit may also be implemented by a plurality of units, or functions of a plurality of units are implemented by one unit. In other embodiments of this application, the synchronization processing apparatus may also include other units. In actual application, the functions may also be cooperatively implemented by other units and may be cooperatively implemented by a plurality of units. According to another embodiment of this application, a computer program (including program code) that can perform the steps in the corresponding methods shown in FIG. 5 to FIG. 6 may be run on a general computing device, such as a computer, which include processing elements and storage elements such as a central processing unit (CPU), a random access memory (RAM), and a read-only memory (ROM), to construct the synchronization processing apparatus shown in FIG. 7, and implement the synchronization processing method in the embodiments of this application. The computer program may be recorded in, for example, a computer readable recording medium, and may be loaded into the foregoing computing device by using the computer readable recording medium, and run on the computing device.

In the embodiments of this application, when performing synchronization processing, the first node device obtains a skeleton set and a synchronization task set, the skeleton set being used for storing M blocks to be synchronized by the first node device; selects a second node device from a candidate node set, the second node device being at least one candidate node device in the candidate node set; concurrently transmits synchronization tasks in the synchronization task set to the second node device, so that the second node device performs the synchronization tasks and returns the M blocks; and then fills the M blocks into the skeletons in the skeleton set. Through the synchronization processing solution for skeleton filling, based on one synchronization task corresponding to one skeleton, the plurality of blocks can be synchronized at one time, effectively improving the synchronization processing efficiency. Synchronization tasks corresponding to a plurality of skeletons can be concurrently transmitted during one synchronization processing, so that more blocks can be synchronized at one time based on the plurality of skeletons, which further improves the synchronization processing efficiency.

Figure 8:
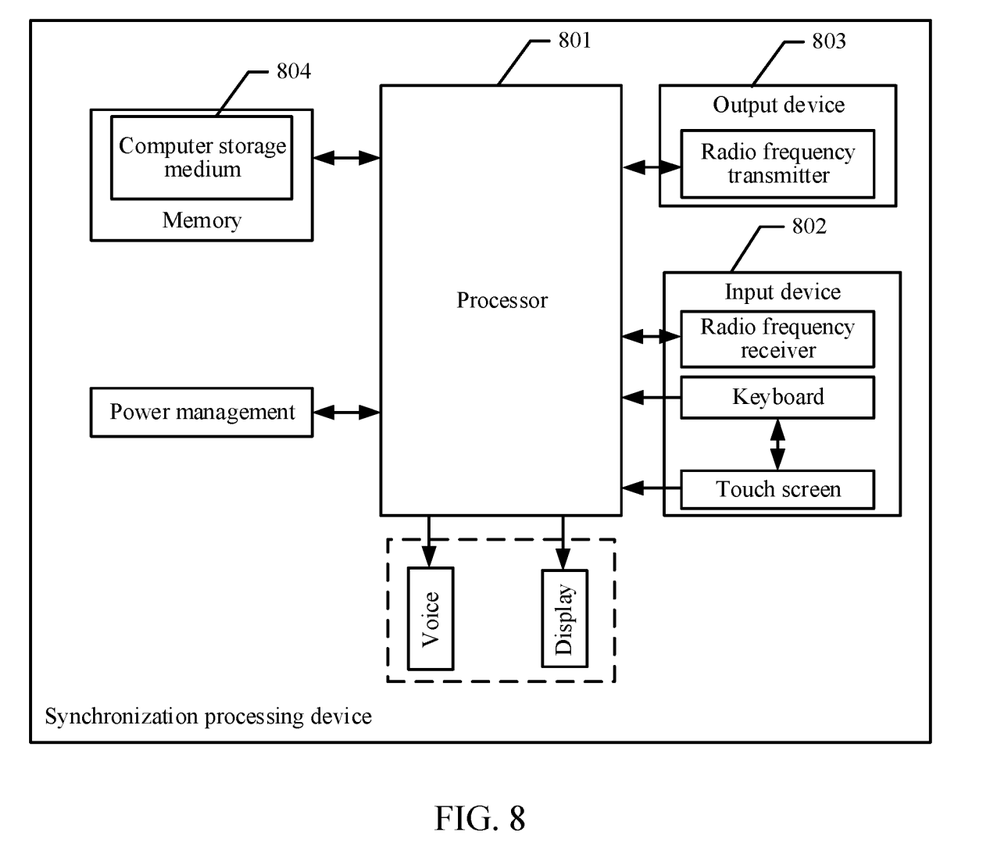
FIG. 8 is a schematic structural diagram of a synchronization processing device according to an exemplary embodiment of this application.

FIG. 8 is a schematic structural diagram of a synchronization processing device according to an exemplary embodiment of this application. This synchronization processing device is a first node device in a blockchain network, and the first node device may be any node device in the blockchain network. For example, the first node device is a node device in the blockchain network shown in FIG. 3. The blockchain network includes a candidate node set, and the candidate node set includes a plurality of candidate node devices connected to the first node device. As shown in FIG. 8, the synchronization processing device includes at least a processor 801, an input device 802, an output device 803, and a computer storage medium 804. The processor 801, the input device 802, the output device 803, and the computer storage medium 804 may be connected by a bus or in another method. The computer storage medium 804 may be stored in a memory of the synchronization processing device. The computer storage medium 804 is configured to store a computer program. The computer program includes program instructions. The processor 801 is configured to execute the program instructions stored in the computer storage medium 804. The processor 801 (or referred to as a central processing unit (CPU)) is a computing core and a control core of the synchronization processing device, is suitable for implementing one or more instructions, and is specifically suitable for loading and executing one or more instructions to implement a corresponding method procedure or a corresponding function provided in the embodiments of this application.

The embodiments of this application further provide a computer storage medium (memory), and the computer storage medium is a memory device in the synchronization processing device and is configured to store programs and data. It may be understood that the computer storage medium herein may include an internal storage medium of the synchronization processing device and certainly may also include an extended storage medium supported by the synchronization processing device. The computer storage medium provides storage space, and the storage space stores an operating system of the synchronization processing device. In addition, the storage space further stores one or more instructions suitable for being loaded and executed by the processor 801. The instructions may be one or more computer programs (including program code). The computer storage medium herein may be a high-speed RAM or a non-volatile memory, for example, at least one magnetic disk memory. In some embodiments, the computer storage medium may further be at least one computer storage medium located away from the foregoing processor.

One or more instructions are stored in the computer storage medium; and one or more second instructions stored in the computer storage medium may be loaded and executed by the processor 801 to implement corresponding steps of the method in the foregoing embodiments related to the synchronization processing method. In one embodiment, the one or more second instructions in the computer storage medium are loaded by the processor 801 to perform the following steps:

obtaining a skeleton set and a synchronization task set, the skeleton set being used for storing M blocks to be synchronized by the first node device, the skeleton set including P skeletons, the synchronization task set including P synchronization tasks, the P skeletons being in a one-to-one correspondence to the P synchronization tasks, and M and P both being positive integers;

selecting a second node device from the candidate node set, the second node device being at least one candidate node device in the candidate node set;

concurrently transmitting synchronization tasks in the synchronization task set to the second node device, so that the second node device performs the synchronization tasks and returns the M blocks; and filling the M blocks into the skeletons in the skeleton set.

In one embodiment, the skeleton set includes a target skeleton, and the target skeleton is any one of the P skeletons; and the target skeleton includes N data units, the N data units are configured to store N blocks to be synchronized by the first node device, the N blocks are in a one-to-one correspondence to the N data units, and N is a positive integer and N≤M.

In one embodiment, The N data units in the target skeleton are sequentially arranged, and the N blocks are consecutive blocks in the blockchain network. an $i^{th}$ data unit among the N data units is configured to store an $i^{th}$ block among the N blocks; and i is a positive integer and 1≤i≤N.

In one embodiment, a target second node device is any one of the second node devices; the target second node device is configured to perform a target synchronization task corresponding to the target skeleton, and return the N blocks to the first node device; and a specific method for the first node device to fill the N blocks into the target skeleton is: respectively filling the N blocks into the N data units of the target skeleton.

In one embodiment, the one or more instructions in the computer storage medium are loaded and executed by the processor 801 to further perform following step:

reading the N blocks stored in the N data units from the target skeleton, and sequentially add the read N blocks to a first blockchain locally stored in the first node device.

In one embodiment, when one or more instructions in the computer storage medium are loaded by the processor 801 to perform the step of selecting a second node device from the candidate node set, the following steps are specifically performed:

obtaining trust degrees of the candidate node devices in the candidate node set; and determining at least one candidate node device whose trust degree in the candidate node set is higher than a trust threshold as the second node device.

In one embodiment, when one or more instructions in the computer storage medium are loaded by the processor 801 to perform the step of selecting a second node device from the candidate node set, the following steps are specifically performed:

obtaining processing performances of the candidate node devices in the candidate node set; and determining at least one candidate node device whose processing performance in the candidate node set is better than a performance threshold as the second node device.

In one embodiment, when one or more instructions in the computer storage medium are loaded by the processor 801 to perform the step of selecting a second node device from the candidate node set, the following steps are specifically performed:

receiving block storage statements of the candidate node devices in the candidate node set; and selecting at least one candidate node device from the candidate node set as the second node device according to the block storage statements of the candidate node devices in the candidate node set.

In one embodiment, when one or more instructions in the computer storage medium are loaded by the processor 801 to perform the step of obtaining a skeleton set, the following steps are specifically performed:

obtaining a block height of a reference blockchain in the blockchain network, and obtain a block height of a first blockchain locally stored in the first node device;

determining M blocks by which the block height of the reference blockchain and the block height of the first blockchain differ as blocks to be synchronized by the first node device; and constructing a skeleton set according to the M blocks.

In the embodiments of this application, when performing synchronization processing, the first node device obtains a skeleton set and a synchronization task set, the skeleton set being used for storing M blocks to be synchronized by the first node device; selects a second node device from a candidate node set, the second node device being at least one candidate node device in the candidate node set; concurrently transmits synchronization tasks in the synchronization task set to the second node device, so that the second node device performs the synchronization tasks and returns the M blocks; and then fills the M blocks into the skeletons in the skeleton set. Through the synchronization processing solution for skeleton filling, based on one synchronization task corresponding to one skeleton, the plurality of blocks can be synchronized at one time, effectively improving the synchronization processing efficiency. Synchronization tasks corresponding to a plurality of skeletons can be concurrently transmitted during one synchronization processing, so that more blocks can be synchronized at one time based on the plurality of skeletons, which further improves the synchronization processing efficiency.

An embodiment of this application further provides a computer program product including instructions, the instructions, when run on a computer, causing the computer to perform the method according to the foregoing embodiments.

What are disclosed above are merely examples of embodiments of this application, and certainly are not intended to limit the protection scope of this application. Therefore, equivalent variations made in accordance with the claims of this application shall fall within the scope of this application.

What is claimed is:

1. A synchronization processing method, performed by a first node device in a blockchain network, the blockchain network comprising a candidate node set, the candidate node set comprising a plurality of candidate node devices connected to the first node device, and the method comprising:

obtaining a skeleton set and a synchronization task set, the skeleton set being used for storing M blocks to be synchronized by the first node device, the skeleton set comprising P skeletons, the synchronization task set comprising P synchronization tasks, the P skeletons being of a one-to-one correspondence to the P synchronization tasks, and M and P both being positive integers;

selecting a second node device from the candidate node set, the second node device being a candidate node device in the candidate node set;

concurrently transmitting synchronization tasks in the synchronization task set to the second node device, comprising:

dividing the synchronization tasks in the synchronization task set into one or more batches and transmitting each batch concurrently according to a corresponding order of the M blocks;

obtaining the M blocks returned by the second node device; and filling the M blocks into the skeletons in the skeleton set.

2. The method according to claim 1, wherein a target skeleton is one of the P skeletons; and the target skeleton comprises N data units, the N data units are configured to store N blocks to be synchronized by the first node device, the N blocks are of a one-to-one correspondence to the N data units, and N is a positive integer and N≤M.

3. The method according to claim 2, wherein the N data units in the target skeleton are sequentially arranged, and the N blocks are consecutive blocks in the blockchain network; an $i^{th}$ data unit among the N data units is configured to store an $i^{th}$ block among the N blocks; and i is a positive integer and 1≤i≤N.

4. The method according to claim 2, wherein a plurality of second node devices is selected from the candidate node set and configured to perform the synchronization tasks, a target second node device is one of the second node devices; the target second node device is configured to perform a target synchronization task corresponding to the target skeleton, and return the N blocks to the first node device; and
for the target second node device, the filling the M blocks into the skeletons in the skeleton set comprises:
respectively filling the N blocks into the N data units of the target skeleton.

5. The method according to claim 4, wherein further comprising:
reading the N blocks stored in the N data units from the target skeleton, and sequentially adding the read N blocks to a first blockchain locally stored in the first node device.

6. The method according to claim 1, wherein the selecting a second node device from the candidate node set comprises:
obtaining trust degrees of the candidate node devices in the candidate node set; and
determining a candidate node device whose trust degree in the candidate node set is higher than a trust threshold as the second node device.

7. The method according to claim 1, wherein the selecting a second node device from the candidate node set comprises:
obtaining processing performances of the candidate node devices in the candidate node set; and
determining a one candidate node device whose processing performance in the candidate node set is better than a performance threshold as the second node device.

8. The method according to claim 1, wherein the selecting a second node device from the candidate node set comprises:
receiving block storage statements of the candidate node devices in the candidate node set; and
selecting a candidate node device from the candidate node set as the second node device according to the block storage statements of the candidate node devices in the candidate node set.

9. The method according to claim 1, wherein the obtaining a skeleton set comprises:
obtaining a block height of a reference blockchain in the blockchain network, and obtaining a block height of a first blockchain locally stored in the first node device;
determining M blocks by which the block height of the reference blockchain and the block height of the first blockchain differ as blocks to be synchronized by the first node device; and
constructing the skeleton set according to the M blocks.

10. The method according to claim 1, wherein the concurrently transmitting synchronization tasks to the second node device includes transmitting indication information, the indication information including a plurality of indexes of blocks corresponding to a first data unit and a last data unit of a target skeleton in the P skeletons.

11. The method according to claim 10, wherein each index of the plurality of indexes comprises a hash value of a corresponding block, a generation timestamp of the corresponding block and a block height of the corresponding block.

12. A synchronization processing apparatus, disposed in a first node device in a blockchain network, the blockchain network comprising a candidate node set, the candidate node set comprising a plurality of candidate node devices connected to the first node device, and the synchronization processing apparatus comprising a memory and a processor coupled to the memory, the processor being configured to:
obtain a skeleton set and a synchronization task set, the skeleton set being used for storing M blocks to be synchronized by the first node device, the skeleton set comprising P skeletons, the synchronization task set comprising P synchronization tasks, the P skeletons being in a one-to-one correspondence to the P synchronization tasks, and M and P both being positive integers;
select a second node device from the candidate node set, the second node device being a candidate node device in the candidate node set; concurrently transmit synchronization tasks in the synchronization task set to the second node device comprising:
divide the synchronization tasks in the synchronization task set into one or more batches and transmit each batch concurrently according to a corresponding order of the M blocks;
obtain the M blocks returned by the second node device; and
fill the M blocks into the skeletons in the skeleton set.

13. The apparatus according to claim 12, wherein a target skeleton is one of the P skeletons; and
the target skeleton comprises N data units, the N data units are configured to store N blocks to be synchronized by the first node device, the N blocks are of a one-to-one correspondence to the N data units, and N is a positive integer and N≤M.

14. A non-transitory computer readable medium storing computer instructions, the computer instructions, when executed by a computer, causing the computer to perform a synchronization processing method comprising:
obtaining a skeleton set and a synchronization task set, the skeleton set being used for storing M blocks to be synchronized by the first node device, the skeleton set comprising P skeletons, the synchronization task set comprising P synchronization tasks, the P skeletons being of a one-to-one correspondence to the P synchronization tasks, and M and P both being positive integers;
selecting a second node device from the candidate node set, the second node device being a candidate node device in the candidate node set;
concurrently transmitting synchronization tasks in the synchronization task set to the second node device, comprising:
dividing the synchronization tasks in the synchronization task set into one or more batches and transmitting each batch concurrently according to a corresponding order of the M blocks;
obtaining the M blocks returned by the second node device; and
filling the M blocks into the skeletons in the skeleton set.

15. The computer readable medium according to claim 14, wherein a target skeleton is one of the P skeletons; and the target skeleton comprises N data units, the N data units are configured to store N blocks to be synchronized by the first node device, the N blocks are of a one-to-one correspondence to the N data units, and N is a positive integer and N≤M.

16. The computer readable medium according to claim 15, wherein the N data units in the target skeleton are sequentially arranged, and the N blocks are consecutive blocks in the blockchain network;

an $i^{th}$ data unit among the N data units is configured to store an $i^{th}$ block among the N blocks; and i is a positive integer and 1≤i≤N.

17. The computer readable medium according to claim 15, wherein a plurality of second node devices is selected from the candidate node set and configured to perform the synchronization tasks, a target second node device is one of the second node devices; the target second node device is configured to perform a target synchronization task corresponding to the target skeleton, and return the N blocks to the first node device; and for the target second node device, the filling the M blocks into the skeletons in the skeleton set comprises:
respectively filling the N blocks into the N data units of the target skeleton.

18. The computer readable medium according to claim 17, wherein further comprising:

reading the N blocks stored in the N data units from the target skeleton, and sequentially adding the read N blocks to a first blockchain locally stored in the first node device.

19. The computer readable medium according to claim 14, wherein the selecting a second node device from the candidate node set comprises:

obtaining trust degrees of the candidate node devices in the candidate node set; and determining a candidate node device whose trust degree in the candidate node set is higher than a trust threshold as the second node device.

20. The computer readable medium according to claim 14, wherein the selecting a second node device from the candidate node set comprises:

obtaining processing performances of the candidate node devices in the candidate node set; and determining a one candidate node device whose processing performance in the candidate node set is better than a performance threshold as the second node device.

* * * * *